M. Smith,
Table Knife, Fork &c.,
No. 126, Reissued Dec. 12, 1848.
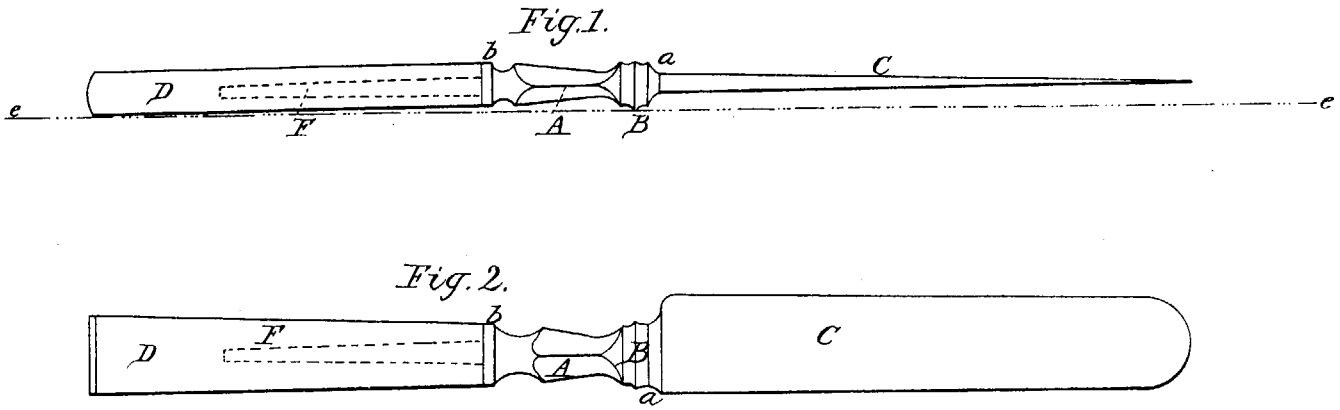
AM. PHOTO-LITHO. CO. N.Y. (OSBORNE'S PROCESS)

UNITED STATES PATENT OFFICE.

MARVIN SMITH, OF MERIDEN, CONNECTICUT.

IMPROVED TABLE-CUTLERY.

Specification forming part of Letters Patent No. 5,827, dated October 3, 1848; Reissue No. 126, dated December 12, 1848.

*To all whom it may concern:*

Be it known that I, MARVIN SMITH, of Meriden, in the county of New Haven and State of Connecticut, have invented a new and useful Improvement in Table Knives, Forks, or Table-Cutlery of like character; and I do hereby declare that the same is fully described and represented in the following specification and accompanying drawings, letters, figures, and references thereof.

Of the said drawings, Figure 1 represents a back edge view of one of my improved balanced knives as resting on the plane of a table which is denoted *e e*. Fig. 2 is a side view of the said knife.

My improvement in table-cutlery consists in placing the bolster, or that part of it which serves as a fulcrum on which the handle is usually made to overbalance the blade of a knife or fork, from one-half an inch to about two inches from that end of the handle which is directly connected with, joins to, or abuts against the shoulder of the tang, as hereinafter described, and generally in place of so much of the blade, I make a shaft or shank, and arrange the same between the bolster and the handle the said shaft or shank, tang, and handle being so made as without any loading of lead, such as is usually inserted in the handle, to be of a greater weight than the blade, or that part of the knife which is on the opposite side of the bolster.

In Figs. 1 and 2, C represents the blade of a table-knife; B, the bolster or fulcrum; A, the shaft or shank; D, the handle.

The dotted lines at F show the tang, which is usually inserted in the handle, and which projects from the shoulder *b* of the shaft or shank A.

In Fig. 1 the rear end of the handle and the middle or projecting edge of the bolster are shown as resting on the plane *e e*, and so as to elevate the blade C above the said plane, the same being raised by the superincumbent weight of the parts on the handle side of the bolster.

The neck of the blade and bolster is seen at *a* in Figs. 1 and 2,

The shoulder *b*, I make of any convenient form, and generally so as to correspond in shape in cross-section to that of that end of the handle which abuts against it. The handle is to be made of ivory or any suitable material, and is firmly cemented to the tang and shoulder.

The mode hitherto practiced of making table-cutlery known by the name of "balanced" knives or forks has been to place the bolster or fulcrum directly at or near the end of the handle, and to join it thereto by means of a shoulder formed of one of the sides of the bolster or fulcrum-block. Such an arrangement or construction requires the handle to be loaded with lead or some other heavy substitute in order that there may be a sufficient weight in the handle to overbalance the weight of the blade. In order to be able to introduce within the handle the necessary quantity of loading, it becomes necessary to cut out or form within it so large a chamber or cavity for the reception of the loading that the handle becomes very much weakened, and so much so that it is very liable, under a slight change of temperature, to crack or split open or be otherwise injured. Besides the above difficulty, another one arises from the manner in which it becomes necessary to make the blade, which in such a case is generally made much thinner and lighter than it is in other kinds of cutlery, or such knives as do not possess the above-mentioned property of keeping their blades from contact with a table or plane surface on which they may be placed.

The design of my improvement is to obviate the objections hereinbefore named, as well as to improve the quality and appearance of the article without impairing it for use.

I do not confine or limit my invention to any particular form or proportion of bolster, shank, blade, handle, or other part or parts of the knife or article possessing it, so long as the improvement made by me can be embodied in or engrafted on the same. I make use of such changes of form as circumstances or convenience may require.

I am aware that a shank has been before employed, it having been placed between the bolster or fulcrum and the blade. I therefore lay no claim to the use of such a shank or such an arrangement of it; nor do I claim the use of the bolster or fulcrum, nor the principle or invention of overbalancing the blade, so as to elevate it above the table when placed thereon, nor the accomplishing the same by the weight of the handle and a load of lead inserted within the handle; but What I do claim as my invention is—

The arrangement and application of the bolster, blade, shank, tang, and handle together in such manner that the weight of the shank, the tang, and handle on one side of the bolster, and independent of any loading of the handle with lead or otherwise, shall be sufficient to overbalance that of the blade of the knife or prongs of the fork, as the case may be, on the other side of it, and thereby raise the said blade or prongs of the fork from a table, as specified, my said arrangement and application of the parts enabling me to entirely dispense with the usual process of loading the handle with lead or other material, whereby it is so reduced as to be very liable to split or crack when in use.

In testimony whereof I have hereto set my signature this 16th day of November, A. D. 1848.

MARVIN SMITH.

Witnesses:

PHINEAS POTTER,
EDW. J. COLLINS.